United States Patent
Ihde et al.

(10) Patent No.: US 7,041,937 B2
(45) Date of Patent: May 9, 2006

(54) WIRE FEEDER OPERABLE WITH LOWER MINIMUM INPUT VOLTAGE REQUIREMENT

(75) Inventors: Jeffrey R. Ihde, Greenville, WI (US); Todd G. Batzler, Hortonville, WI (US); Brian L. Ott, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 187 days.

(21) Appl. No.: 10/250,118

(22) Filed: Jun. 4, 2003

(65) Prior Publication Data

US 2004/0245232 A1    Dec. 9, 2004

(51) Int. Cl.
*B23K 9/12* (2006.01)

(52) U.S. Cl. ................................ 219/137.71

(58) Field of Classification Search ........... 219/137.71, 219/130.1, 130.31, 130.32, 130.33; 363/21.09, 363/97

See application file for complete search history.

(56) References Cited

U.S. PATENT DOCUMENTS

| | | | | |
|---|---|---|---|---|
| 2,636,102 | A * | 4/1953 | Lobosco ................ | 219/137.71 |
| 4,247,752 | A * | 1/1981 | Stringer ................ | 219/130.33 |
| 4,508,954 | A * | 4/1985 | Kroll ...................... | 219/137.71 |
| 4,709,316 | A * | 11/1987 | Ngo et al. .............. | 363/97 |
| 4,985,821 | A * | 1/1991 | Cohen .................... | 363/21.09 |
| 5,260,545 | A * | 11/1993 | West et al. ............. | 219/137.71 |
| 5,885,674 | A * | 3/1999 | Maemoto et al. ...... | 363/21.09 |
| 6,066,834 | A * | 5/2000 | Rebold .................. | 219/137.71 |
| 6,204,479 | B1 * | 3/2001 | Sickels .................. | 219/137.71 |
| 6,657,163 | B1 * | 12/2003 | Blankenship et al. .. | 219/137.71 |

* cited by examiner

*Primary Examiner*—Clifford C. Shaw
(74) *Attorney, Agent, or Firm*—Ziolkowski Patent Solutions Group, SC

(57) ABSTRACT

The present invention is directed to a power supply that maintains power supply to a plurality of electronic components of a welding system when an arc voltage falls below approximately 15 volts. The invention includes a power supply having a secondary supply circuit that improves the operable range of the power supply by maintaining power to components of a welding system when the arc voltage at a weld is greater than or equal to approximately 10 volts. As a result, the operable range of the power supply is no longer limited by the arc voltage. The invention includes a secondary power supply circuit having a power switch that when activated causes a buildup of energy in the transformer assembly whereupon deactivation of the power switch in the magnetic core is exhausted such that power supply is maintained. The power switch regulates the transformer assembly such that sufficient secondary power is provided if the input voltage to the transformer is as low as approximately 10 volts.

19 Claims, 3 Drawing Sheets

WIRE FEEDER OPERABLE WITH LOWER MINIMUM INPUT VOLTAGE REQUIREMENT

BACKGROUND OF INVENTION

The present invention relates generally to a welding-type system and, more particularly, to a wire feeder having lower minimum input voltage requirement. Specifically, the invention is directed to a power supply that maintains power supply to controlled electronics for implementing a welding-type process when output voltage falls below 15 volts.

Wire feeders are typically used to feed metal wire into a weld during a welding process such as Gas Metal Arc Welding (GMAW) and other welding processes. Typical wire feeders have a drive roller assembly for driving the metal wire feed from a feed spindle through a welding gun for introduction to the weld. Power is supplied to the drive roller assembly by a welding power supply via a weld cable. The amperage or current generated by the power supply governs the speed in which the metal feed is fed to the weld, or the wire feed speed (WFS). Generally, the higher the amperage supplied to the wire feeder, the greater the WFS. Conversely, if voltage is used to govern the WFS, the lower the voltage, the lower the WFS. Accordingly, the speed by which the wire feeder supplies the metal filler to the weld is a direct function of the power delivered to the wire feeder and therefore, the weld. Furthermore, by adjusting the WFS and holding either voltage or current constant, the adjustment to the WFS causes the non-constant value to be adjusted accordingly.

The thickness of the metal being welded determines the power required at the weld and thus the WFS necessary to deliver that power. A thicker metal requires higher power to effectively weld. The wire feeder includes a wire feed control to control the power delivered to both the wire feeder and the point of the weld. Typically, the Wire feed control allows the welding system to operate in at least one of two modes: constant voltage (CV) or constant current (CC).

Should the user choose CV mode, as is most common, a user selected voltage is required. The voltage is an indication of the voltage desired at the point of the weld and is held constant by the power supply. It is also necessary to select an initial WFS. The WFS indicates the speed with which the metal filler is delivered to the point of the weld but when the mode is CV, also corresponds to an output current. By holding the output voltage constant, the user can manipulate the output current by adjusting the WFS. Since the WFS is directly proportional to the current delivered to the wire feeder and point of the weld, the higher the WFS, the greater the current delivered to the weld. However, should the user choose CC the user input current is held constant and the wire feeder can adjust the WFS to obtain the desired voltage at the weld. In this case, the user must lower the WFS in order to raise the voltage at the weld or raise the WFS to lower the voltage at the weld.

Some wire feeders are powered or work off the arc voltage of the welding system. With these wire feeders, which are commonly referred to as "voltage sensed wire feeders" and are operable in either a CC or CV mode, arc voltage from a point at the weld area is input to a power conditioning or power converting assembly. The power converting assembly is designed to provide a secondary power that is usable by the electronic components of the wire feeder. To maintain consistent operation of the wire feeder, the arc voltage must be sufficient to drive the power converting assembly. Otherwise, the power converting assembly may be unable to supply sufficient secondary voltage to power the wire feeder's electronic components. Customarily, the power converting assembly is unable to output sufficient secondary voltage if the arc voltage falls below approximately 15–16 volts. As a result, the components of the wire feeder are not sufficiently powered and cease to function properly. That is, there is a drop-out of weld power when the arc voltage falls below 15 volts thereby causing the arc voltage to be the limiting factor of the system rather than the components of the wire feeder.

It would therefore be desirable to design a power supply that supplies sufficient secondary power to a wire feeder and other components of a welding system when arc voltage is below 15 volts thereby increasing the range of operability of the welding system.

DESCRIPTION OF INVENTION

The present invention is directed to a power supply that maintains power supply to a plurality of electronic components of a welding system when an arc voltage falls below 15 volts that overcomes the aforementioned drawbacks. Specifically, the invention is a power supply having a buck boost-derived power supply circuit that improves the operable range of the power supply by maintaining power to components of a welding system when the arc voltage at a weld is greater than or equal to approximately 10 volts. As a result, the operable range of the power supply is not limited by the arc voltage. The invention includes a power supply circuit having a power switch that when activated causes a buildup of energy in the gaps of a transformer assembly whereupon deactivation of the power switch, energy is exhausted from the gaps such that power supply is maintained. As such, the transformer assembly may output sufficient secondary voltage to power a plurality of controlled electronics of the welding system despite an arc voltage level or value of 20 volts or less. In this regard, the voltage requirements of the controlled electronics are the limiting factors of the welding system. Accordingly, if the power semiconductor devices of the system operate acceptably with gate drives of less than 15 volts would allow a drop in secondary voltage input to as low as 5 volts.

Therefore, in accordance with one aspect of the present invention, a power supply for a wire feeder includes a power input connected to receive an arc voltage as well as a conditioned power output. The power supply further includes a power conditioner to condition power from the power input and supply conditioned power to the conditioned power output. A plurality of controlled electronic components is provided and connected to the conditioned power output to receive a portion of the conditioned power. The power conditioner is configured to maintain a supply of conditioned power to the plurality of controlled electronic components when the arc voltage is greater than or equal to approximately 10 volts or below.

In accordance with another aspect of the present invention, a power supply includes a power input to receive power from a welding-type output as well as a secondary power circuit configured to receive power from the power input and supply conditioned power. A portion of the conditioned power is used to supply power to a plurality of electronics used to executed a welding-type process. The secondary power circuit is further configured to maintain power to the plurality of electronics when power delivered to the power input is greater than or equal to approximately 5 volts.

According to another aspect of the present invention, the welding system includes a drive assembly to contribute welding wire to a weld area as well as a welding torch connected to the wire drive assembly. The welding system further includes a power supply to transform primary power from an outside electrical source to a secondary power at a current and a voltage to maintain a welding arc at the weld area. The power supply is further configured to maintain power to at least the wire drive assembly when voltage at the welding area falls below approximately 15 volts.

In accordance with a further aspect of the present invention, a kit is provided to retrofit a power supply to provide adequate power to electronic components of a wire feeder when arc voltage at a weld falls below approximately 15 volts. The kit includes a transformer configured to condition an input power to provide an output power at a current and a voltage. The kit also includes a power switch connected to receive feedback as to the output power and regulate the transformer such that the voltage of the output power is at a level sufficient to power electronic components of a wire feeder when the input power has a voltage greater than or equal to 5 volts.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
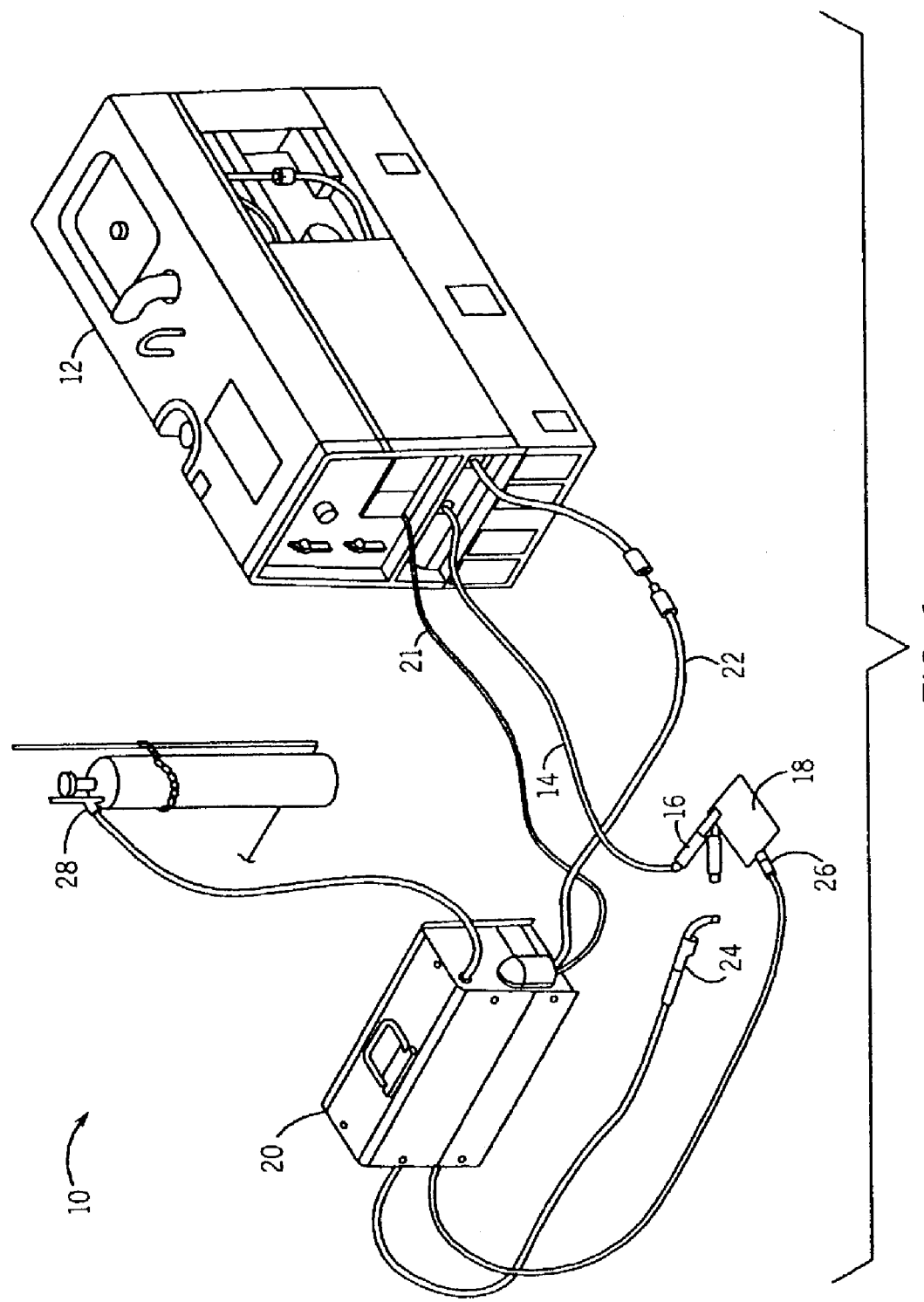
FIG. 1 is a perspective view of a wire feed control attached to a welding power source and a welding apparatus.

Referring to FIG. 1, a welding-type system 10 is show incorporating the present invention. System 10 includes at least one power source 12, which can be an AC or a DC welding power supply operable in either a constant current (CC) or constant voltage (CV) mode. The power source 12 has a work cable 14 and clamp 16 designed to hold a workpiece 18 for welding. Power source 12 is also connected to a wire feeder 20 via an input power cord or cable 21. Cable 21 is designed to translate power from the power source 12 or other power supply to the wire feeder. Also connected between the power source 12 and the wire feeder 20 is a weld cable 22. The wire feeder 20 also includes a welding torch or gun 24 and a and a voltage sensing lead with clip 26 configured to provide voltage at the weld feedback to the wire feeder. A shielding gas cylinder 28 is also connected to the wire feeder 20 to provide shielding gas for the welding process.

The wire feeder includes a wire drive assembly (not shown) that includes a spool of welding wire (not shown) that is supplied to the weld under control of a controller (not shown) that is connected to the power source 12 through cord 22. The controller is governed by a microprocessor capable of being programmed to operate according to certain algorithms and/or programs. User selections or inputs received by the controller from a display and control panel (not shown) and an internally programmed algorithm cause welding system 10 to operate according to the user selections.

When the welding torch 24 is positioned proximate to workpiece 18, welding wire is fed into contact with the workpiece 18. Once triggered, an electrical current and voltage are generated to cause the welding wire to be heated and melt. As a result, an electrical arc is established which causes the welding wire to continue to melt as well as transfer the melted welding wire to the workpiece 18 where the welding wire fuses and cools with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting and improving bonding between the melted welding wire and the workpiece 18. As the welding torch 24 is translated across the workpiece 18, melted welding wire is continuously transferred to the workpiece 18.

In one exemplary embodiment, the wire feeder is configured to operate on 115 VAC control input power with an open circuit/arc voltage weld input power level ranging from approximately 10 volts to 100 volts DC. The power source is designed to operate in either a CC or CV mode. In CC mode, the wire feed speed is generally 30–350 inches per minute (ipm) and in CV mode the speed ranges from 30–60 ipm. The wire feeder is designed to introduce flux cored, solid steel, or stainless steel welding wire to a weld. One skilled in the art would appreciate that these value are illustrative of only one particular welding assembly and that the present invention is equivalently applicable with other welding systems having different operating specifications.

The present invention will be described with respect to a constant current power supply designed to condition raw power from an outside electrical source to a form usable in a welding process and to supply power to components of a welding system. The present invention is particularly applicable to a power supply operating in a CC mode where it is necessary for a wire feeder to vary the speed in which wire feed is delivered to a weld area so as to maintain a desired arc voltage. The present invention, however, is equally applicable to other types of power supplies and for other welding-type systems or power supplies operating in other modes such as AC/DC and CC/CV. Additionally, the present invention will be described with respect to a circuit to power a volt sensed wire feeder. In this regard, the wire feeder is powered by a secondary power supply that conditions power received from an arc voltage input. As such, reference to components such as "transformer," "switch," and "rectifying circuit" corresponds to those components as they are found in a secondary power supply circuit for the wire feeder and not the primary power supply to produce a welding output.

Figure 2:
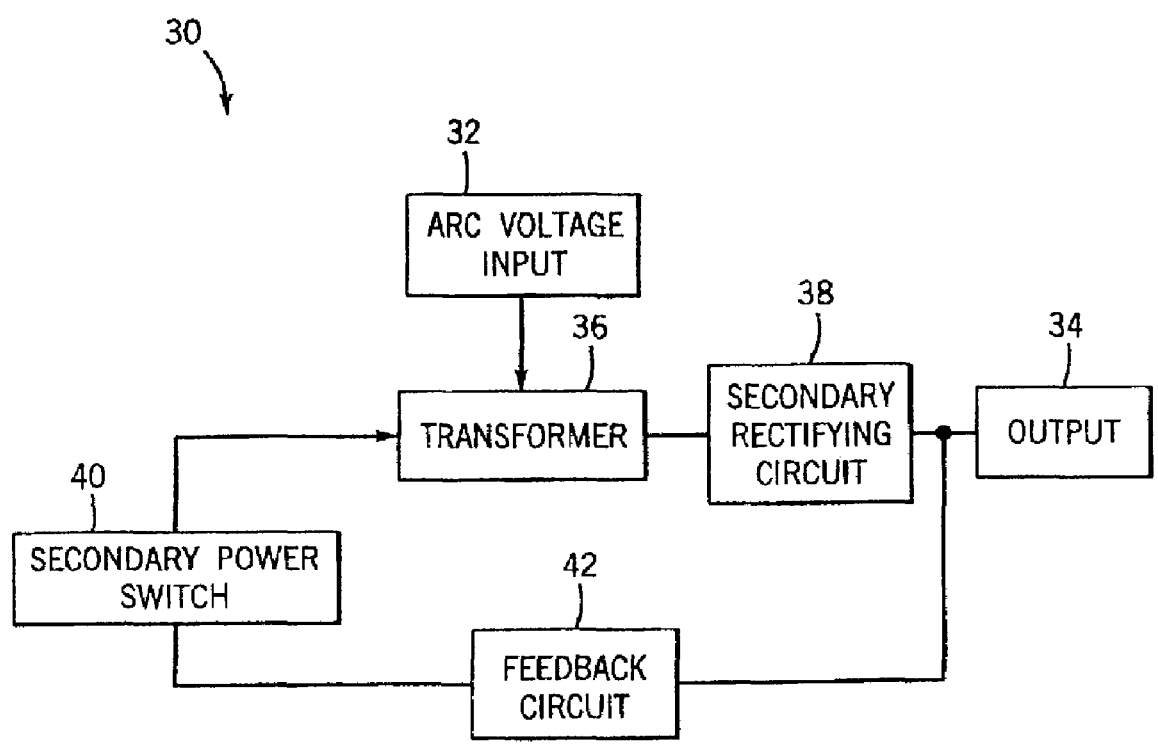
FIG. 2 is a block diagram of a power supply circuit for providing power to a wire feeder of a welding system in accordance with the present invention.

Referring to FIG. 2, a block diagram of a power supply circuit 30 for a voltage sensed wire feeder is shown. The power supply circuit includes a power switch arranged in a flyback converter mode to control energy development in a transformer. Circuit 30 is designed to take an arc voltage input 32 and provide an output 34 that is usable to power controlled components of the voltage sensed wire feeder. A transformer or suitable inductor 36 is used to condition the arc voltage input to a voltage and current level suitable for output. Typically, the arc voltage input is approximately 10–100 volts and must be conditioned down to a level of approximately twenty volts. A secondary rectifying circuit 38, typically a pair of diodes connected in line with a secondary winding of the transformer 36, rectifies the output of the transformer to provide a rectified DC power signal to output 34. As will be described in greater detail below, linear regulators or other circuitry may be positioned between the rectifying circuit and the output to get a desired Â±15 volts necessary for operation of the wire feeder's electronic components from the rectified outputs. Various capacitive and resistive elements (not shown) may also be implemented to smooth out the output signals.

Circuit 30 includes a power switch 40 to regulate the firing of transformer 36. Power switch 40 is designed to close when current in the transformer falls below zero. That is, circuit 30 is constructed such that when the diodes of the rectifying circuit stop conducting, the power switch is closed. As such, circuit 30 includes feedback circuit 42 to provide information from the output of rectifying circuit 38 regarding current conduction as well as voltage across the diodes. The feedback circuit may include voltage dividers, optocouplers, and other circuitry to provide the requisite feedback to the power switch. Preferably, the current through the transformer falls for only an instant at worst case conditions, i.e. maximum output current and minimum input voltage. Circuit 30 is configured such that immediately after current in the transformer falls below zero, power switch 40 closes resulting in a recharging of the magnetic core of the transformer, as will be described below.

Power switch 40 regulates the charging of the magnetic core of the transformer assembly. By allowing current through the transformer to drop below zero, a smaller transformer may used. That is, if current through the transformer was not allowed to fall below zero, a much larger transformer or inductor would be required having larger energy storage characteristics. Additionally, less input to the primary winding of the transformer is needed to charge the magnetic core. For example, a voltage input level of as low as ten volts may be used to drive the core of the assembly if the primary winding(s) of the transformer are fired at a sufficiently high frequency.

Power switch 40 is constructed to provide high speed switching or firing of the primary winding(s) of the transformer. The higher the firing frequency of the transformer the greater amount of energy that is generated in the magnetic core and subsequently output by the secondary winding(s). As such, the switching frequency of the power switch can be set such that sufficient energy in the magnetic core may be stored. Secondary output of twenty volts may then be maintained even if the arc voltage (input voltage to circuit 40) falls lower than approximately ten volts.

Figure 3:
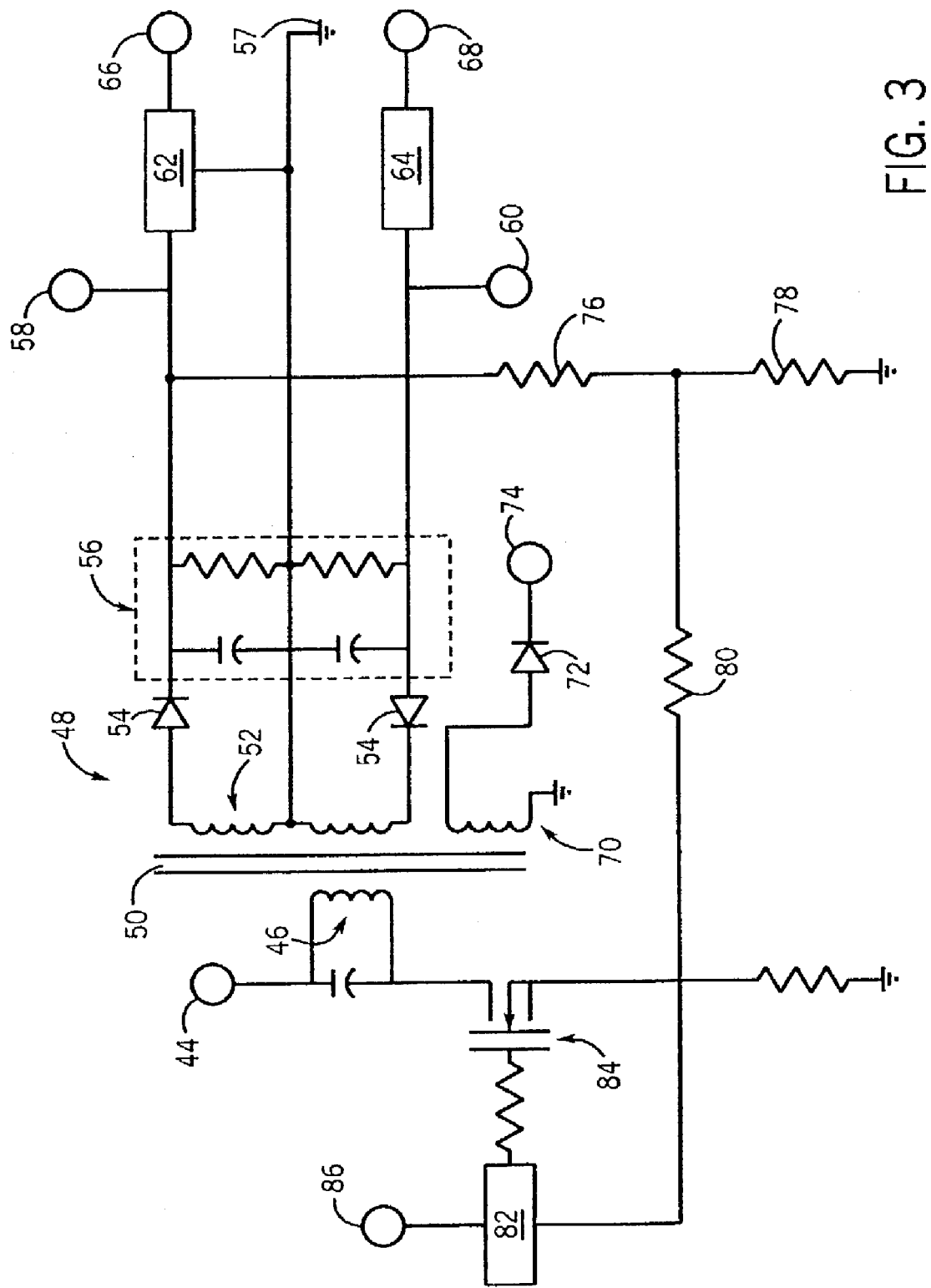
FIG. 3 is a circuit schematic illustrating one embodiment of the present invention.

Referring now to FIG. 3, a schematic illustrating one example for carrying out the present invention is shown. One skilled in the art will readily appreciate that the circuit schematic illustrated in FIG. 3 sets forth one example in which the present invention may be embodied. That is, other configurations incorporating and embodying the present invention different from that which is expressly shown are contemplated and within the scope of the present invention. Furthermore, the schematic, as shown, is provided as a representation of operational circuitry. That is, while the schematic is designed to illustrate features of the invention, it is not contemplated to encompass all elements of circuitry necessary to implement the current invention or illustrate the only circuit capable of carrying out the invention.

Further, the exemplary circuit set forth below illustrates one example of a secondary power supply circuit that is a derivation of a boost circuit topology that leverages the turns ratio of coupled inductors, i.e., a flyback transformer, to perform a voltage level translation. With this circuit and its equivalents, controlled electronics of a welding system that require a regulated Â±15 volts input may be powered when the arc voltage falls to as low as approximately 5 volts. In this regard, the present invention provides a circuit topology that uses an arc voltage to sustain the control circuits of a power supply or source and allow power conversions to be maintained at reduced arc voltage levels.

Arc voltage is received by input 44 and is used to power the electronic components of the wire feeder. Input 44 is designed to receive a voltage ranging from approximately 10 volts or less to approximately 100 volts and is connected to a primary winding 46 of a transformer 48. In one embodiment, transformer 48 is a multi-output transformer. Transformer 48 includes a magnetic core 50 positioned between primary winding 46 and a secondary winding assembly 52. Core 50 is designed to be charged such that energy is stored in gaps within the transformer assembly which is used by the secondary winding assembly 52 to provide a secondary power at a voltage above or below the input voltage to the primary winding. As such, transformer 48 is constructed to buck or boost the voltage input thereto. To provide a rectified input to the electronic components of the wire feeder, the circuit includes a pair of rectifying diodes 54. Passive components 56 are used to remove distortion from the output of the secondary winding assembly and, in essence, smooth out the output signal. As such, a voltage of positive twenty volts, with respect to ground 57, is produced at terminal 58. Similarly, a voltage of negative twenty volts, with respect to ground 57, is produced at terminal 60.

Linear regulators 62, 64 are used to step down the voltage at terminals 58 and 58 to create a voltage output of positive fifteen volts and negative fifteen volts at output terminals 66 and terminal 68, respectively. Alternatively, it is contemplated that a voltage divider or other suitable circuitry may be used to achieve a positive and negative fifteen volt output at terminals 66 and terminal 68, respectively. Output terminals 66, 68 are then used to deliver the desired Â±15 volts necessary for operation of the wire feeder and its components.

Secondary winding assembly 70 also provides an isolated voltage output that is used to power the triggering assembly (not shown) of the welding system. As such, a rectifying diode 72 is connected to the output side of the secondary winding assembly such that an isolated twenty-four volts is supplied to terminal 74 for delivering power to the triggering assembly.

The circuit also includes feedback components that in the illustrated example includes a series of resistors 76–80 that serve as a voltage divider to provide feedback to power switch controller 82 designed to control power switch 84. The feedback components are designed to provide information to the power switch controller as to the conductive state of rectifiers 54. Rectifiers 54 are designed to be forward biased if the voltage thereacross exceeds a prescribed value, typically, 0.7 volts. If the voltage across the diodes is less than 0.7 volts then the diodes cease conduction and an open circuit condition occurs between the diodes and the output terminals. As a result, power is no longer supplied to the electronic components of the wire feeder. The present invention, therefore, implements feedback components to provide feedback to the switch controller 82 as to the conduction state of the diodes. The power switch 84 is designed to close when diodes 54 cease conduction thereby indicating that energy in the transformer has been exhausted. Once the switch 84 closes, the transformer is flooded with energy from input 44 so as to restore energy to the gaps within the transformer. Once the energy is sufficient in the gaps to bias diodes 54, the diodes resume conduction and power is delivered to terminals 66 and 68.

Power switch 84 may be a MOSFET designed to regulate the firing of the transformer as governed by the power switch controller. That is, power switch 84 is biased by an output of switch controller 82 such that firing of the primary winding of the transformer may be controlled. Switch 84 is designed to fire the primary winding at sufficient frequency such that at lower input voltage levels (arc voltage as low as 5 volts) sufficient energy storage is supplied to the transformer such that a secondary voltage sufficient to power the components of the wire feeder is maintained. The switching frequency of the power switch may be set such that the MOSFET causes firing of the primary winding at extremely high speeds. The speeds are fast enough to cause a buildup of energy in the magnetic core without sufficient power loss. As a result, secondary voltage output may be maintained despite low input voltages to the primary winding. Switch controller 84 is preferably powered by a fifteen volt input voltage via terminal 86.

Therefore, in accordance with one embodiment of the present invention, a power supply for a wire feeder includes a power input connected to receive an arc voltage as well as deliver conditioned power output. The power supply further includes a power conditioner to condition power from the power input and supply conditioned power to the conditioned power output. A plurality of controlled electronic components is provided and connected to the conditioned power output to receive a portion of the conditioned power. The power conditioner is configured to maintain a supply of conditioned power to the plurality of controlled electronic components when the arc voltage is greater than or equal to approximately 10 volts.

In accordance with another embodiment of the present invention, a power supply includes a power input to receive power from a welding-type output as well as a secondary power circuit configured to receive power from the power input and supply conditioned power. A portion of the conditioned power is used to supply power to a plurality of electronics used to executed a welding-type process. The secondary power circuit is further configured to maintain power to the plurality of electronics when power delivered to the power input is greater than or equal to approximately 5 volts.

According to another embodiment of the present invention, the welding system includes a drive assembly to contribute welding wire to a weld area as well as a welding torch connected to the wire drive assembly. The welding system further includes a power supply to transform primary power from an outside electrical source to a secondary power at a current and a voltage to maintain a welding arc at the weld area. The power supply is further configured to maintain power to at least the wire drive assembly when voltage at the welding area falls below approximately 15 volts.

In accordance with a further embodiment of the present invention, a kit is provided to retrofit a power supply to provide adequate power to electronic components of a wire feeder when arc voltage at a weld falls below approximately 15 volts. The kit includes a transformer configured to condition an input power to provide an output power at a current and a voltage. The kit also includes a power switch connected to receive feedback as to the output power and regulate the transformer such that the voltage of the output power is at a level sufficient to power electronic components of a wire feeder when the input power has a voltage greater than or equal to 5 volts.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

What is claimed is:

1. A power supply for a wire feeder, the power supply comprising:
   a power input connected to receive an arc voltage;
   a conditioned power output;
   a power conditioner to condition power from the power input and supply conditioned power to the conditioned power output;
   a plurality of controlled electronic components connected to the conditioned power output to receive a portion of the conditioned power;
   wherein the power conditioner maintains a supply of conditioned power to the plurality of controlled electronic components when the arc voltage is as low as approximately 5 volts.

2. The power supply of claim 1 wherein the power conditioner further includes a transformer assembly having a magnetic core disposed between a primary winding connected to the power input and a secondary winding connected to the conditioned power output.

3. The power supply of claim 2 further including a power switch to regulate operation of the transformer assembly.

4. The power supply of claim 3 wherein the power switch is configured to regulate the transformer assembly such that a plurality of rectifier diodes connected to the secondary winding are periodically placed in a blocking state to allow energy storage in air gaps of the transformer assembly.

5. The power supply of claim 4 wherein the transformer assembly is further configured to exhaust the energy stored in the air gaps when the power switch is not activated.

6. A power supply for a welding-type system, the power supply comprising:
   a power input to receive power from a welding-type output;
   a secondary power circuit configured to receive power from the power input and supply conditioned power, a portion of which is used to supply power to a plurality of electronics used to execute a welding-type process; and
   wherein the secondary power circuit is further configured to maintain power to the plurality of electronics when power delivered to the power input is as low as approximately 5 volts.

7. The power supply of claim 6 wherein the secondary power circuit is further configured to maintain power to the plurality of electronics when voltage at the power input is less than approximately 15 volts.

8. The power supply of claim 6 wherein the secondary power circuit includes:
   a transformer having a magnetic core, a primary winding, and a secondary winding; and a power switch connected to the primary winding to regulate energy storage in an air gap between the magnetic core and the secondary winding.

9. The power supply of claim 8 wherein the power switch is further configured to vary firing of the primary winding to regulate output of the secondary winding.

10. The power supply of claim 9 wherein the secondary power circuit includes a series of rectifier diodes connected to the secondary winding and wherein the power switch is further configured to control the firing of the primary winding such that the series of rectifier diodes is placed in a blocking state when the power switch is activated.

11. The power supply of claim 10 wherein the power switch is further configured to control the primary winding to soak the magnetic core with energy when activated.

12. A welding system comprising:
    a wire drive assembly to contribute welding wire to a weld area;
    a welding torch connected to the wire drive assembly; and
    a power supply to transform primary power from an outside electrical source to a secondary power at a current and a voltage to maintain a welding arc at the weld area, the power supply further configured to maintain a desired operating voltage to at least the wire drive assembly when voltage at the welding area falls below approximately 15 volts and below the desired operating voltage of the wire drive assembly;
    wherein the power supply includes a flyback converter power supply circuit having:
        a primary winding;
        a secondary winding;
        a magnetic core disposed between the primary winding and the secondary winding;
        a set of rectifier diodes to rectify an output of the secondary winding to provide a DC power to the at least wire drive assembly; and
        a power switch to control firing of the primary winding such that sufficient power to maintain operation of the at least the drive assembly is output by the secondary winding when input to the primary winding is as low as approximately 5 volts.

13. The welding system of claim 12 wherein the power supply is further configured to maintain power to the wire drive assembly when voltage at the welding area is greater than approximately 10 volts.

14. The welding system of claim 12 wherein the primary winding is further configured to soak the magnetic core with energy when the power switch is activated.

15. The welding system of claim 14 wherein the secondary winding is further configured to exhaust energy stored in an air gap between the magnetic core and the second winding when the power switch is not activated.

16. The welding system of claim 15 wherein the stored energy is sufficient to forward bias the set of rectifier diodes to allow energy to be delivered to the at least the drive assembly.

17. The welding system of claim 12 further comprising a volt sensed wire feeder.

18. The welding system of claim 12 wherein the power supply is further configured to provide a welding output having a constant current.

19. A kit to retrofit a power supply, the kit comprising:
    a transformer configured to condition a welding power and configured to provide an output power at a current and a voltage to an electrical component of a wire feeder; and
    a power switch connected to receive feedback as to the output power and regulate the transformer such that the voltage of the output power is at a level sufficient to power the electronic component of the wire feeder when the welding power has a voltage of 5 volts.

* * * * *

UNITED STATES PATENT AND TRADEMARK OFFICE
CERTIFICATE OF CORRECTION

PATENT NO. : 7,041,937 B2 Page 1 of 1
APPLICATION NO. : 10/250118
DATED : May 9, 2006
INVENTOR(S) : Ihde et al.

It is certified that error appears in the above-identified patent and that said Letters Patent is hereby corrected as shown below:

Col. 5, line 1, delete Â ;

Col. 5, line 65, delete Â; and

Col. 6, line 33, delete Â .

Signed and Sealed this

Tenth Day of April, 2007

JON W. DUDAS
*Director of the United States Patent and Trademark Office*